United States Patent
Senga

(10) Patent No.: US 9,011,130 B2
(45) Date of Patent: Apr. 21, 2015

(54) TOGGLE CLAMPING MECHANISM FOR INJECTION MOLDING MACHINE

(71) Applicant: Fanuc Corporation, Minamitsuru-gun, Yamanashi (JP)

(72) Inventor: Masatoshi Senga, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/225,159

(22) Filed: Mar. 25, 2014

(65) Prior Publication Data
US 2014/0295020 A1    Oct. 2, 2014

(30) Foreign Application Priority Data

Mar. 26, 2013   (JP) .................................. 2013063993
Nov. 25, 2013   (JP) .................................. 2013243186

(51) Int. Cl.
*B29C 45/66*    (2006.01)
*B29C 45/17*    (2006.01)

(52) U.S. Cl.
CPC ......... *B29C 45/66* (2013.01); *B29C 2045/1792* (2013.01)

(58) Field of Classification Search
CPC ............................ B29C 45/661; B29C 45/681
USPC ................ 425/190, 593, 451.6; 100/281, 286
See application file for complete search history.

(56) References Cited

U.S. PATENT DOCUMENTS

| 6,626,658 B2 | 9/2003 | Ito et al. |
| 7,114,948 B2 * | 10/2006 | Nishimura et al. ............ 425/589 |
| 7,134,870 B2 * | 11/2006 | Nishimura et al. ............ 425/589 |
| 2004/0265423 A1 | 12/2004 | Yoshioka et al. |

FOREIGN PATENT DOCUMENTS

| JP | 71526 A | 1/1995 |
| JP | 2001260196 A | 9/2001 |
| JP | 2004358902 A | 12/2004 |
| JP | 2009132087 A | 6/2009 |

OTHER PUBLICATIONS

Office Action mailed Aug. 12, 2014, corresponding to Japanese patent application No. 2013-243186.

* cited by examiner

*Primary Examiner* — James Mackey
(74) *Attorney, Agent, or Firm* — Lowe Hauptman & Ham, LLP

(57) ABSTRACT

A toggle clamping mechanism for an injection molding machine includes a toggle link, a crosshead connected to the toggle link, and a driving device for driving the crosshead. A ball spline shaft is provided parallel to a ball screw for driving the crosshead. Further, a ball spline nut provided in the crosshead is engaged with the ball spline shaft so that the crosshead may be guided by the ball spline shaft.

3 Claims, 7 Drawing Sheets

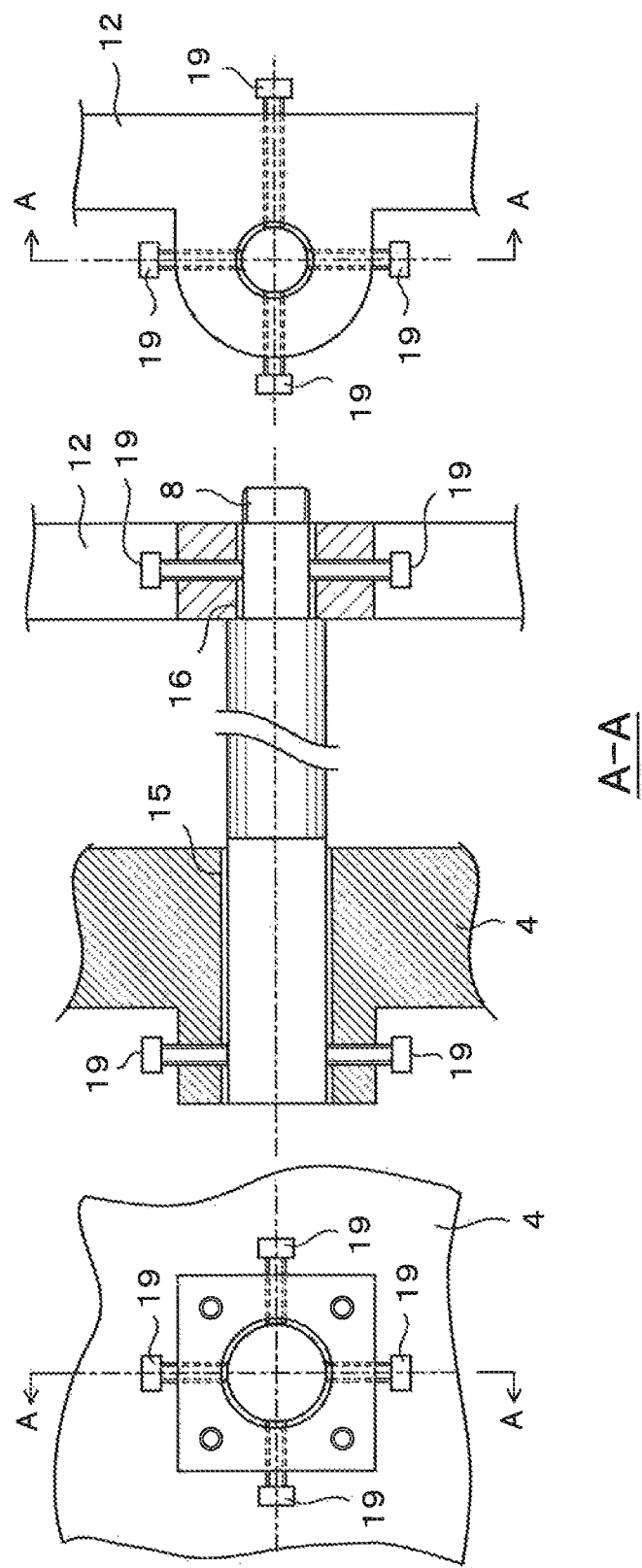

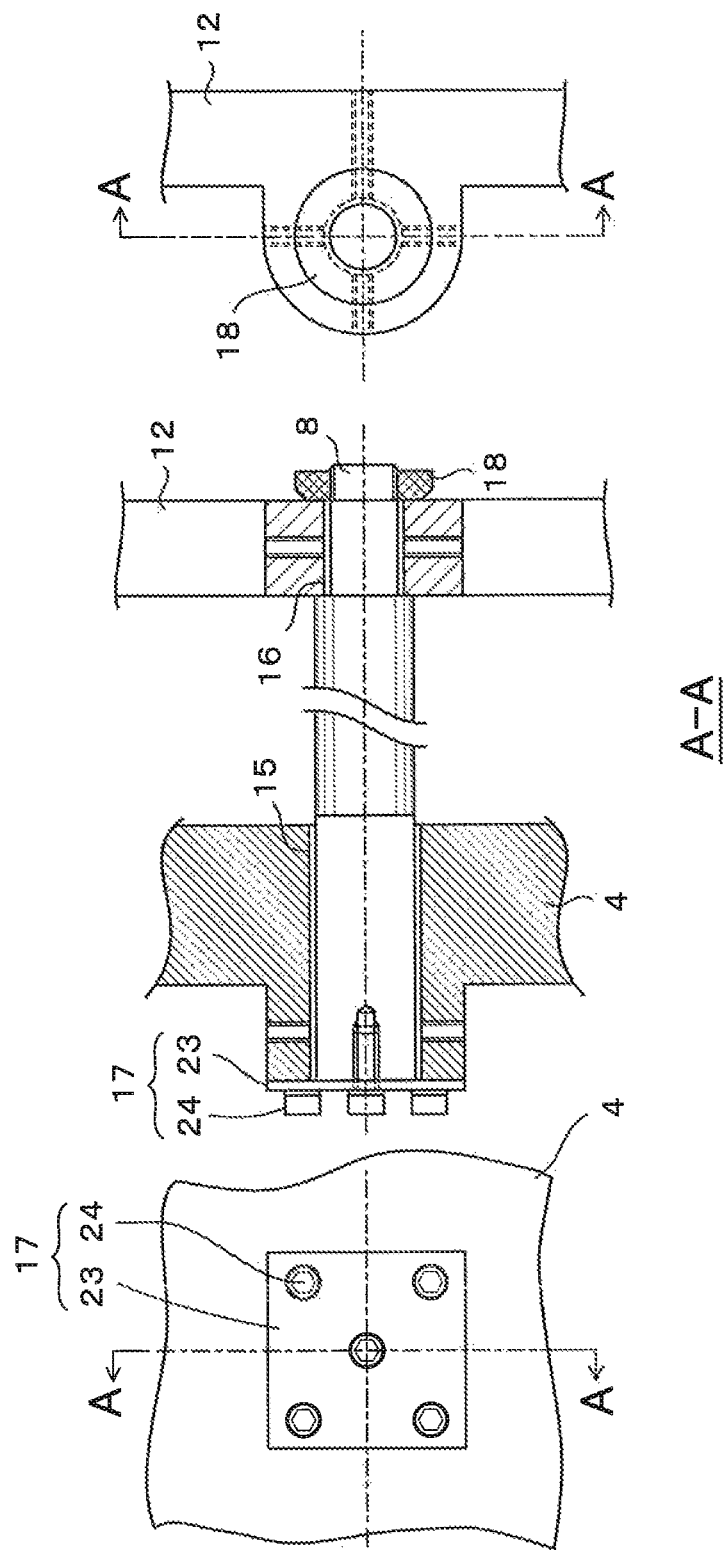

TOGGLE CLAMPING MECHANISM FOR INJECTION MOLDING MACHINE

RELATED APPLICATIONS

The present application claims priority to Japanese Application Number 2013-063993 filed Mar. 26, 2013 and Japanese Application Number 2013-243186 filed Nov. 25, 2013, the disclosures of which are hereby incorporated by reference herein in their entirety.

BACKGROUND OF THE INVENTION

1. Field of the Invention

The present invention relates to a toggle clamping mechanism which is used in an injection molding machine and which prevents the inclination of a movable platen by maintaining the position of a crosshead on a center axis between upper and lower links.

2. Description of the Related Art

As shown in FIG. 6, a mold clamping apparatus of an injection molding machine includes a fixed platen 2 fixed to a base 1, and a movable platen 3 movably disposed parallel to the fixed platen 2. A fixed-side mold half (not shown) is attached to the fixed platen 2, and a movable-side mold half (not shown) is attached to the movable platen 3. The injection molding machine opens, closes, and clamps the mold by advancing and retracting the movable platen 3 with respect to the fixed platen 2.

After the mold is clamped, melted resin is injected from an injection unit (not shown) into the mold. At this time, a sufficiently strong clamping force needs to be applied so that the mold may not be opened by the pressure of injection. Accordingly, a toggle link structure which amplifies a force using toggle links 6 is generally used. In this toggle link structure, a crosshead 7 connected to the movable platen 3 with the toggle links 6 is advanced or retracted by a ball screw 11 rotationally driven by the driving device 10, and the thrust of the crosshead 7 is amplified by the toggle links 6 to generate a clamping force.

With regard to clamping force and mold surface parallelism, to prevent imbalance between upper and lower portions of the mold, generally, the crosshead 7 is disposed on a line connecting the center of the fixed platen 2 and the center of the movable platen 3, and the toggle links 6 are disposed symmetrically about the crosshead 7.

In prior art, as a mechanism for a guide for the crosshead 7, bushings (plain bearings) are inserted into the crosshead 7 and the crosshead 7 is slid along guide rods. In that case, for smooth sliding, a clearance needs to be provided between each bushing and the corresponding guide rod. However, as shown in FIG. 6, due to this clearance, the position of the crosshead 7 is lowered below the center of the guide rod by gravitation, or the crosshead 7 may be inclined by load imbalance between upper and lower portions. In that case, there occurs an angle difference between the upper toggle link 6 and the lower toggle link 6. As a result, the movable platen 3 inclines, and there occurs the problem that a mold mount surface of the movable platen 3 and a mold mount surface of the fixed platen 2 are not parallel. If the mold mount surfaces are not parallel, misalignment occurs between the fixed-side mold half attached to the fixed platen 2 and the movable-side mold half attached to the movable platen 3. Accordingly, problems such as defective shapes of molded products and wear in alignment pins of the mold occur.

Japanese Patent Application Laid-Open No. 2001-260196 discloses a technique for preventing the inclination of a movable platen by employing ball spline shafts in portions of tie rods along which the movable platen slides. In this technique, using ball spline shafts as tie rods, ball spline nuts attached to the movable platen are engaged with (ball-splined to) the ball spline shafts (tie rods). However, this configuration requires as many as four ball spline shafts, thus increasing costs.

Moreover, Japanese Patent Application Laid-Open No. 2009-132087 discloses a technique for reducing the inclination of a movable platen by raising the front sides of guide rods for a crosshead to correct the displacement of the crosshead. However, even when the displacement of the crosshead is compensated using this technique, there is a clearance between each of bushings inserted into the crosshead and the corresponding guide rod, and therefore the crosshead inclines to generate an angle difference between the upper and lower toggle links. As a result, the problem of the inclination of the movable platen occurs.

SUMMARY OF THE INVENTION

In view of the above-described problems in the prior arts, an object of the present invention is to provide a toggle clamping mechanism which is used in an injection molding machine and which prevents the inclination of a movable platen by maintaining the position of a crosshead on a center axis between upper and lower links.

A toggle clamping mechanism for an injection molding machine according to the present invention includes a toggle link, a crosshead connected to the toggle link, a driving device for driving the crosshead, a ball spline shaft provided approximately parallel to a ball screw for driving the crosshead, and a ball spline nut provided in the crosshead. The crosshead is guided by the ball spline shaft.

There may be two of the ball spline shafts disposed in a horizontal plane symmetrically about the ball screw for driving the crosshead.

A support/fixation member may support or fixe the ball spline shaft, and an adjusting mechanism capable of displacing a position of a portion of the ball spline shaft, supported or fixed by the support/fixation member, with respect to the support/fixation member may be incorporated in the support/fixation member. Thus, a position of the ball spline shaft with respect to the ball screw and/or an angle of the ball spline shaft are adjustable by the adjusting mechanism.

The present invention can provide a toggle clamping mechanism which is used in an injection molding machine and which prevents the inclination of a movable platen by maintaining the position of a crosshead on a center axis between upper and lower links.

BRIEF DESCRIPTION OF THE DRAWINGS

The forgoing and other objects and feature of the invention will be apparent from the following description of preferred embodiments of the invention with reference to the accompanying drawings, in which:

FIG. 3A illustrates a first example of an adjusting mechanism which is incorporated in the toggle clamping mechanism of FIG. 2 and which adjusts the positions of supported portions of a ball spline shaft.

FIG. 3B illustrates a second example (modified example of the first example) of an adjusting mechanism which is incorporated in the toggle clamping mechanism of FIG. 2 and which adjusts the positions of supported portions of a ball spline shaft.

DETAILED DESCRIPTION OF THE PREFERRED EMBODIMENTS

Figure 1:
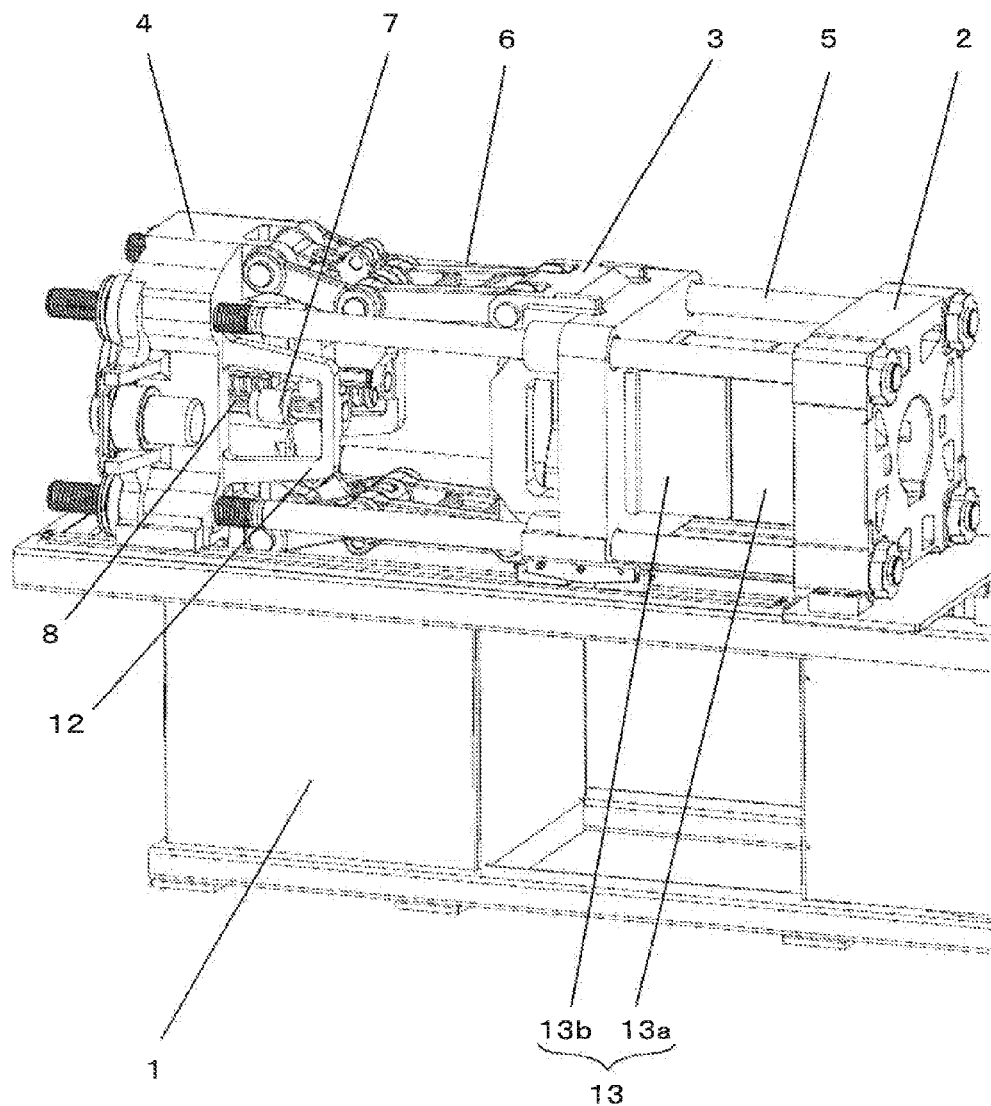
FIG. 1 is a perspective view showing an appearance of one embodiment of a toggle clamping mechanism for an injection molding machine according to the present invention.

One embodiment of a toggle clamping mechanism for an injection molding machine according to the present invention will be described with reference to FIGS. 1 and 2.

The clamping mechanism for the injection molding machine includes a fixed platen 2 fixed on a base 1, a rear platen 4 movably provided at a certain distance from the fixed platen 2, plural (four in the example shown in FIGS. 1 and 2) tie rods 5 connecting the fixed platen 2 and the rear platen 4, and a movable platen 3 provided to be movable in the axial direction of the tie rods 5. A mold 13 includes a fixed-side mold half 13a attached to the fixed platen 2 and a movable-side mold half 13b attached to the movable platen 3.

The movable platen 3 is connected to a crosshead 7 with toggle links 6 disposed symmetrically in the vertical direction. A ball screw nut 14 is attached to the crosshead 7. The crosshead 7 is advanced and retracted by rotating the ball screw 11 using a driving device 10 such as a servo motor. The crosshead 7 is configured to be guided by guide rods fixed to the rear platen 4 so as not to rotate or displace a position during the advance and retraction. The guide rods are fixed in positions parallel to the ball screw 11.

Figure 2:
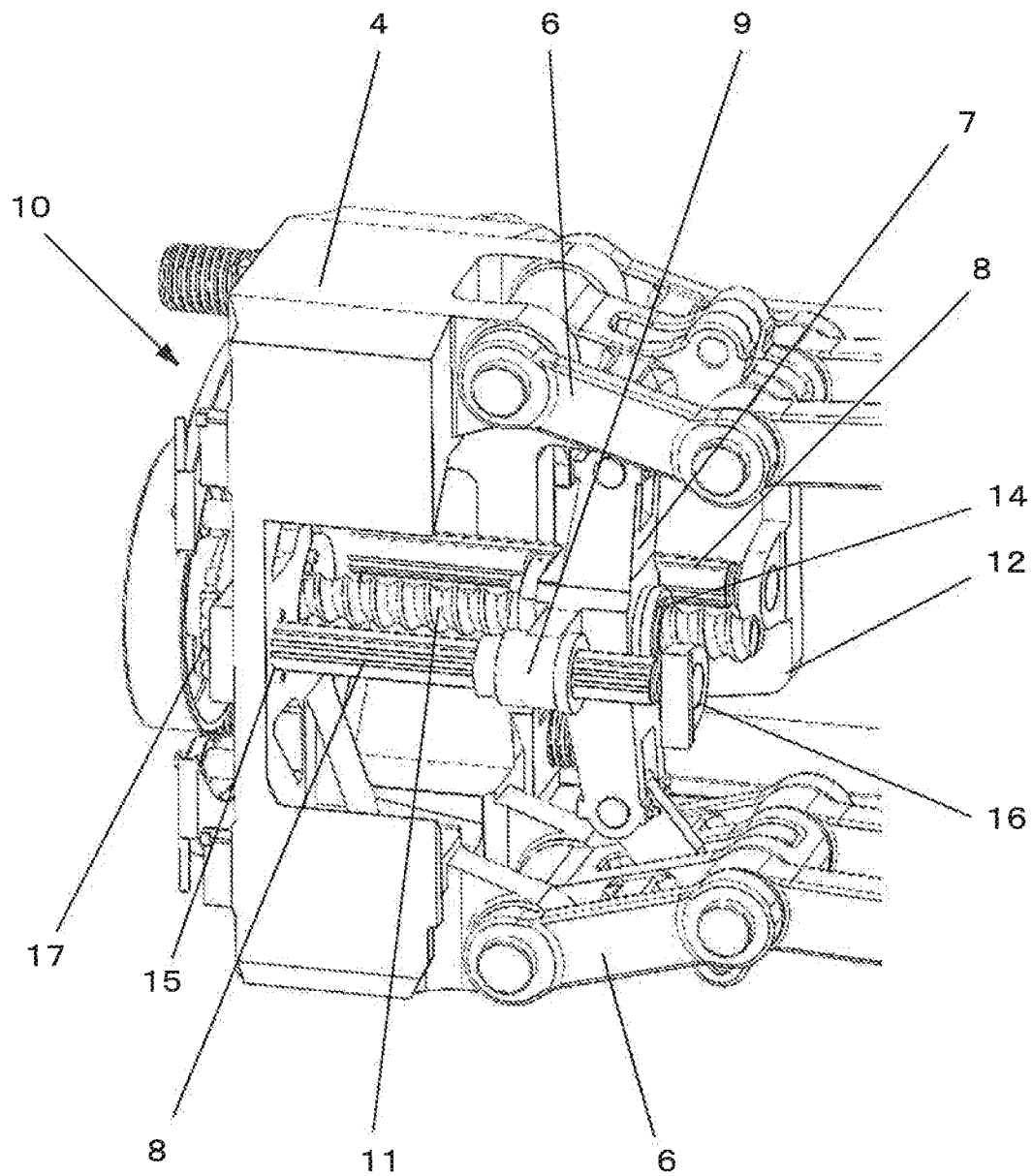
FIG. 2 is an enlarged view for explaining the toggle clamping mechanism shown in FIG. 1.

In the toggle clamping mechanism shown in FIG. 2, ball spline shafts 8 are used as the guide rods. The crosshead 7 has two ball spline nuts 9. These two ball spline nuts 9 are guided by the two ball spline shafts 8. One ends (first ends) of the respective ball spline shafts 8 are passed through holes 15 formed in the rear platen 4 and fixed to the rear platen 4 with first-end fixing members 17, 17. In the example shown in FIGS. 1 and 2, using plates and bolts as the first-end fixing members 17, the ball spline shafts 8 are fixed to the rear platen 4 with the plates and the bolts. On the other hand, other ends (second ends) of the respective ball spline shafts 8 are inserted into holes 16 formed in support frames 12 and thereby supported by the support frames 12. The support frames 12 are integral with the rear platen 4 in FIG. 1, but may be members independent from the rear platen 4. Hereinafter, ends of the ball spline shafts 8 on the rear platen 4 side are referred to as first ends, and ends thereof on the support frame 12 side are referred to as second ends.

Balls (ball bearings) are engaged with respective raceway grooves of the ball spline shafts 8 and the ball spline nuts 9. Since no clearance is provided between the balls and the raceway grooves, a structure in which there is no play between shaft and nut is obtained. Accordingly, the position of the crosshead 7 is maintained on a center axis between the toggle links 6, and the inclination of the crosshead 7 can be made small.

In the example shown in FIGS. 1 and 2, the ends (first and second ends) of the ball spline shafts 8 are supported. However, positions on the ball spline shafts 8 other than the ends thereof may be supported.

It should be noted that in the description of the embodiment of the present invention, the phrase a first member A "supports" a second member B means that the first member A is in contact directly with the second member B and subject to a load directly from the second member B. In that case, the first member A supporting the second member B is referred to as a "support member." Moreover, when the second member B is supported by the first member A, a portion of the second member B which is a contacting portion between the second member B and the first member A is referred to as a "supported portion of the second member B which is supported by the first member A" or simply referred to as a "supported portion of the second member B."

In the example shown in FIGS. 1 and 2, there are three kinds of components which can serve as support members for the ball spline shafts 8: the rear platen 4, the first-end fixing members 17, and the support frames 12. However, the number of such support members may be any desired number, and the ball spline shafts 8 may be supported by the support members at any desired positions. Moreover, each ball spline shaft 8 is fixed as follows: at least one position on the ball spline shaft 8 which is appropriate to fix the ball spline shaft 8 is selected, and each selected position on the ball spline shaft 8 is fixed to any of components constituting the injection molding machine.

In the example shown in FIGS. 1 and 2, to more accurately fix the position of the crosshead 7 and reduce the inclination of the crosshead 7, the positions of supported portions of the ball spline shafts 8 (positions of portions of the ball spline shafts 8 which are supported by the support members) and the angles (orientations) of the ball spline shafts 8 are adjusted. It should be noted that the positions of the supported portions of the ball spline shafts 8 and the angles of the ball spline shafts 8 may be represented using a coordinate system provided on an upper surface of the base 1, or may be represented using values determined with respect to the central axis of the ball screw 11.

Hereinafter, some examples of the adjusting mechanism will be described in which the positions of supported portions of the ball spline shaft 8 and the angle of the ball spline shaft 8 can be adjusted by adjusting the positions of the supported portions of the ball spline shaft 8 in directions intersecting the central axis of the ball spline shaft 8. In this adjusting mechanism, the position of the ball spline shaft 8 can also be adjusted without changing the angle thereof by adjusting a mechanism for adjusting the first end of the ball spline shaft 8 and a mechanism for adjusting the second end thereof and moving the ball spline shaft 8 parallel to itself.

Hereinafter, examples of adjusting mechanisms which are provided in the toggle clamping mechanism shown in FIGS. 1 and 2 will be described with reference to FIGS. 3A to 5.

A first example of an adjusting mechanism which is incorporated in the toggle clamping mechanism of FIG. 2 and which adjusts the positions of supported portions of a ball spline shaft will be described with reference to FIG. 3A.

As shown in FIG. 3A, one or more tapped holes are provided around each of the hole 15 of the rear platen 4 and the hole 16 of the support frame 12. As support members for supporting the ball spline shaft 8, adjusting bolts 19 are installed into the tapped holes. At least one of the positions of supported portions of the ball spline shaft 8 supported by the adjusting bolts 19 and the angle of the ball spline shaft 8 can be adjusted by adjusting the tightnesses of the adjusting bolts 19. The adjusting bolts 19 are installed into the tapped holes of the support frame 12 such that the central axes of the adjusting bolts 19 intersect the central axis of the ball spline shaft 8 (preferably, at right angles).

By adjusting the tightnesses of the adjusting bolts 19, the positions of the supported portions of the ball spline shaft 8 can be adjusted in directions intersecting the central axis of the ball spline shaft 8. Moreover, by adjusting the positions of the supported portions of the ball spline shaft 8 in this way, the angle of the ball spline shaft 8 (e.g., the angle of the ball spline shaft 8 with respect to the central axis of the ball screw 11 for driving the crosshead 7) can also be adjusted. After the adjustment, the ball spline shaft 8 is fixed.

A second example of an adjusting mechanism which is incorporated in the toggle clamping mechanism of FIG. 2 and which adjusts the positions of supported portions of a ball spline shaft will be described with reference to FIG. 3B. This second example is a modified example of the above-described first example.

As shown in FIG. 3B, the first end of the ball spline shaft 8 is fixed to the rear platen 4 with the first-end fixing members 17, and the second end thereof is fixed to the support frame 12 with the second-end fixing members 18. In the example shown in FIG. 3B, using a plate 23 and bolts 24 as the first-end fixing members 17, the ball spline shaft 8 is fixed to the rear platen 4 with the plate 23 and the bolts 24. Further, using nuts as the second-end fixing members 18, the ball spline shaft 8 is fixed to the support frame 12 by use of the nuts and a threaded portion provided in the ball spline shaft 8. After the ball spline shaft 8 is fixed, the bolts 24 may be removed. Moreover, using set screws instead of the bolts 24, the set screws may be used to fix the ball spline shaft 8 without being removed after adjustment.

A third example of an adjusting mechanism which is incorporated in the toggle clamping mechanism of FIG. 2 and which adjusts the positions of supported portions of a ball spline shaft will be described with reference to FIG. 4.

Figure 4:
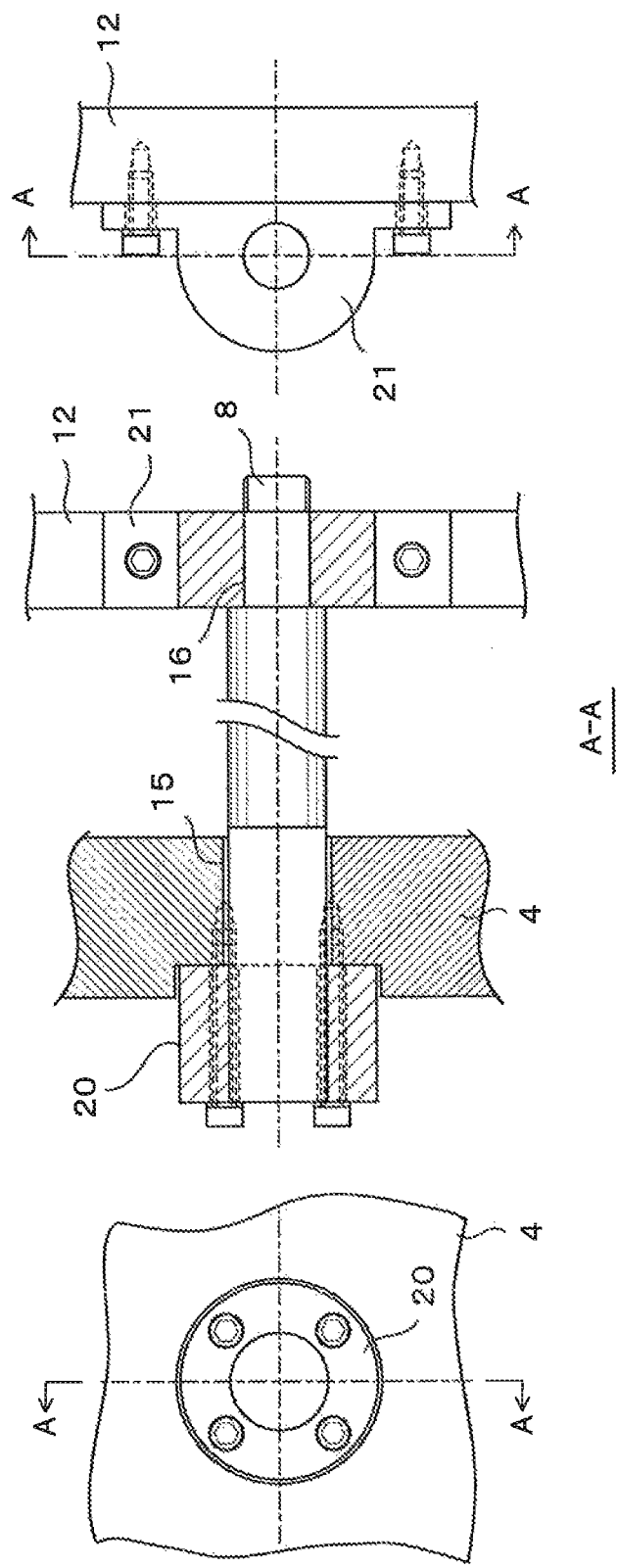
FIG. 4 illustrates a third example of an adjusting mechanism which is incorporated in the toggle clamping mechanism of FIG. 2 and which adjusts the positions of supported portions of a ball spline shaft.

In the example shown in FIG. 4, a first end support member 20 different from the rear platen 4 is prepared to support the first end of the ball spline shaft 8, and a second end support member 21 different from the support frame 12 is prepared to support the second end of the ball spline shaft 8. By adjusting at least one of the support positions and the support angles of the support members 20 and 21, at least one of the positions of supported portions of the ball spline shaft 8 supported by the support members 20 and 21 and the angle of the ball spline shaft 8 can be adjusted. The support positions of the first end support member 20 and the second end support member 21 can be adjusted (displaced) in directions intersecting the central axis of the ball spline shaft 8. As a result, the positions of supported portions of the ball spline shaft 8 can be adjusted (displaced) in directions intersecting the central axis of the ball spline shaft 8. Moreover, as in the aforementioned first example shown in FIG. 3A, the angle of the ball spline shaft 8 with respect to the ball screw for driving the crosshead can also be adjusted.

In the example shown in FIG. 4, holes into which bolts are inserted are provided in the first end support member 20. By inserting bolts into the holes, the first end support member 20 is fixed to the rear platen 4. At least one of the fixed position and fixed angle of the first end support member 20 to the rear platen 4 can be adjusted by amounts corresponding to clearances between the holes of the first end support member 20 and the bolts inserted into the holes. On the other hand, holes into which bolts are inserted are also provided in the second end support member 21, and the second end support member 21 is fixed to the support frame 12 by inserting bolts into the holes. At least one of the fixed position and fixed angle of the second end support member 21 to the support frame 12 can be adjusted by amounts corresponding to clearances between the holes of the second end support member 21 and the bolts inserted into the holes.

A fourth example of an adjusting mechanism which is incorporated in the toggle clamping mechanism of FIG. 2 and which adjusts the positions of supported portions of a ball spline shaft will be described with reference to FIG. 5.

Figure 5:
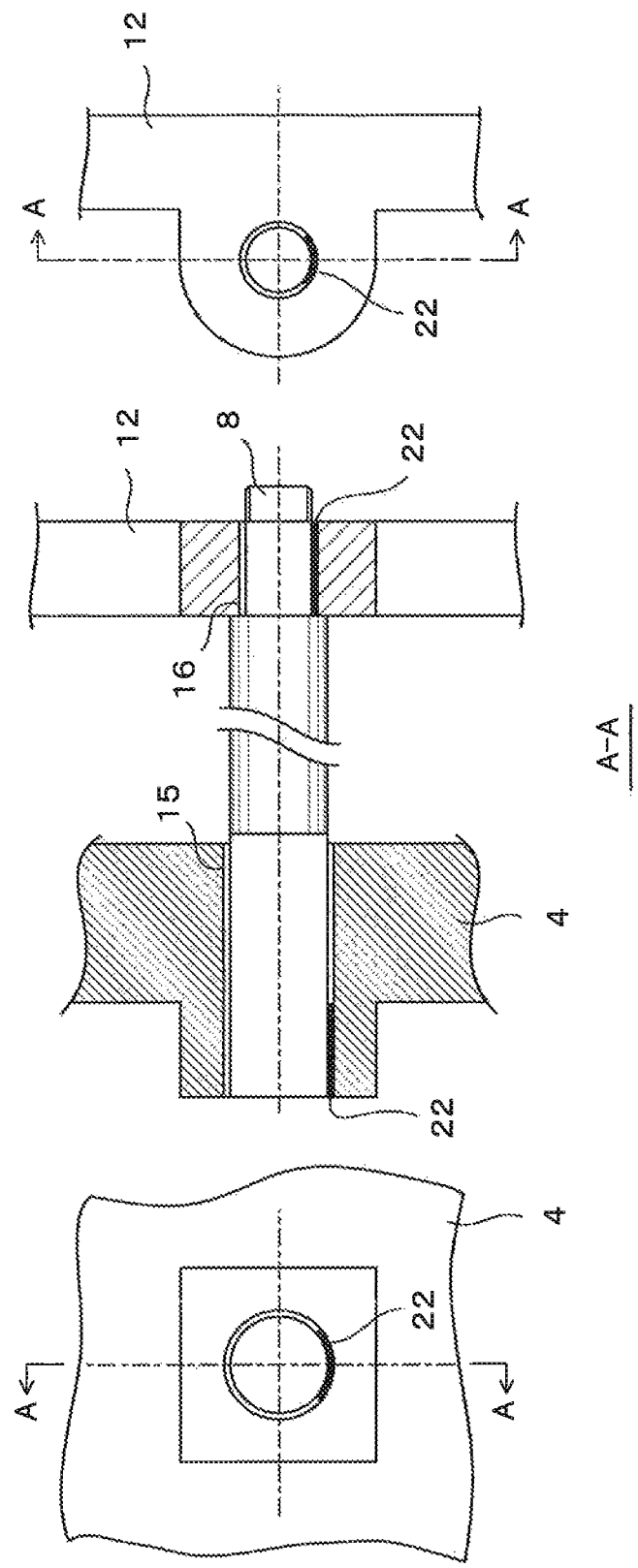
FIG. 5 illustrates a fourth example of an adjusting mechanism which is incorporated in the toggle clamping mechanism of FIG. 2 and which adjusts the positions of supported portions of a ball spline shaft.
Figure 6:
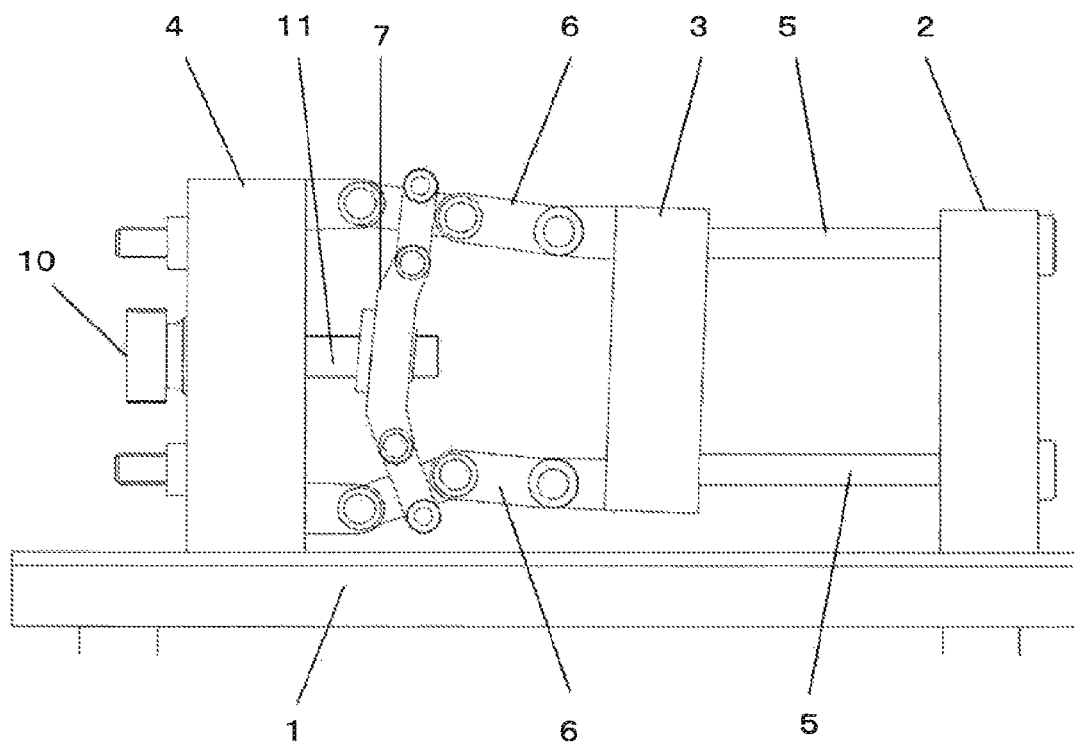
FIG. 6 illustrates one example of a mold clamping apparatus used in an injection molding machine of a prior art.

In the example shown in FIG. 5, shims 22 having appropriate thicknesses are inserted between the ball spline shaft 8 and the holes 15 of the rear platen 4 and between the ball spline shaft 8 and the holes 16 of the support frame 12. Thus, at least one of the positions of supported portions of the ball spline shaft 8 and the angle of the ball spline shaft 8 is adjusted. The positions of supported portions of the ball spline shaft 8 can be adjusted in directions intersecting the central axis of the ball spline shaft 8 by inserting the shims 22. Moreover, as in the aforementioned first and second examples respectively shown in FIGS. 3A and 3B, the angle of the ball spline shaft 8 can also be adjusted.

It should be noted that all of the positions of supported portions of the ball spline shaft 8 do not need to be adjustable. It is enough to provide adjusting mechanisms so that only the positions of supported portions which are considered as needing adjustment can be adjusted. Moreover, in the case where adjusting mechanisms are provided for plural supported portions, different adjusting mechanisms may be respectively employed for the plural supported portions. For example, the adjusting mechanism using the bolts 24 shown in FIG. 3B (second example) may be employed for the first end of the ball spline shaft 8, with the adjusting mechanism using the shims 22 shown in FIG. 5 (fourth example) being employed for the second end of the ball spline shaft 8. Further, as described in the example shown in FIG. 3B, a fixing mechanism dedicated to fixation may be prepared as a fixing mechanism for fixing the ball spline shaft 8 after adjustment, or an adjusting mechanism may be used as a fixing mechanism.

In the above-described embodiment of the present invention, the ball spline shafts 8 are disposed parallel to the ball screw 11 for driving the crosshead 7, and the ball spline nuts 9 are provided in the crosshead 7 to eliminate play in the crosshead 7. Thus, the position of the crosshead 7 can be maintained on a center axis between the upper and lower toggle links 6, and the inclination of the crosshead 7 can be reduced. Further, by providing adjusting mechanisms for adjusting at least one of the positions of supported portions of the ball spline shafts 8 and the angles of the ball spline shafts 8, the position of the crosshead 7 can be more accurately fixed, and the inclination of the crosshead 7 can be reduced. As a result, since the upper and lower toggle links 6 are driven symmetrically in the vertical direction, the movable platen 3 does not incline, and a mold surface of the fixed-side mold half 13a attached to the fixed platen 2 and a mold surface of the movable-side mold half 13b attached to the movable platen 3 are maintained parallel. Accordingly, misalignment between the fixed-side mold half 13a and the movable-side mold half 13b is eliminated. Thus, defective shapes of molded products and wear in alignment pins of the mold can be prevented.

The present invention has the feature that the ball spline shafts 8 are provided parallel to the ball screw 11 for driving the crosshead 7. However, for example, after adjusting mechanisms are adjusted so that the inclination of the crosshead 7 (or the movable platen 3) may be reduced while the inclination of the crosshead 7 (or the movable platen 3) is being measured, the first end of the ball spline shaft 8 is located at a higher position than the second end with respect to the central axis of the ball screw 11, and the ball spline shaft 8 may become non-parallel to the ball screw 11 in a strict sense. However, if the orientation of the ball spline shaft 8 with respect to the ball screw 11 (parallelism of the ball spline shaft 8 and the ball screw 11) is within the range of adjustment by the adjusting mechanism, the expression "the ball spline shaft is provided parallel to the ball screw for driving the crosshead" is used in the present invention.

The invention claimed is:

1. A toggle clamping mechanism for an injection molding machine, said toggle clamping mechanism comprising:
   a toggle link;
   a crosshead connected to the toggle link;
   a ball screw for driving the crosshead;
   a driving device for driving the ball screw;
   a ball spline shaft provided parallel to the ball screw; and
   a ball spline nut provided in the crosshead;
   wherein the crosshead is guided by the ball spline shaft.

2. The toggle clamping mechanism for an injection molding machine according to claim 1, wherein there are two of the ball spline shafts disposed symmetrically about the ball screw for driving the crosshead.

3. The toggle clamping mechanism for an injection molding machine according to claim 1, further comprising:
   a support/fixation member which supports or fixes the ball spline shaft, and
   an adjusting mechanism for displacing a position of a portion of the ball spline shaft, supported or fixed by the support/fixation member, with respect to the support/fixation member, wherein
   the adjusting mechanism is incorporated in the support/fixation member, and
   the adjusting mechanism is configured to adjust at least one of
      a position of the ball spline shaft with respect to the ball screw, or
      an angle of the ball spline shaft with respect to the ball screw.

* * * * *